Feb. 17, 1953  V. G. POLITSCH  2,628,428
GLASS LEVEL GAUGE AND RECORDER
Filed June 23, 1948  3 Sheets-Sheet 1

Inventor
VERNEY G. POLITSCH

By Rule & Hoge.
Attorneys

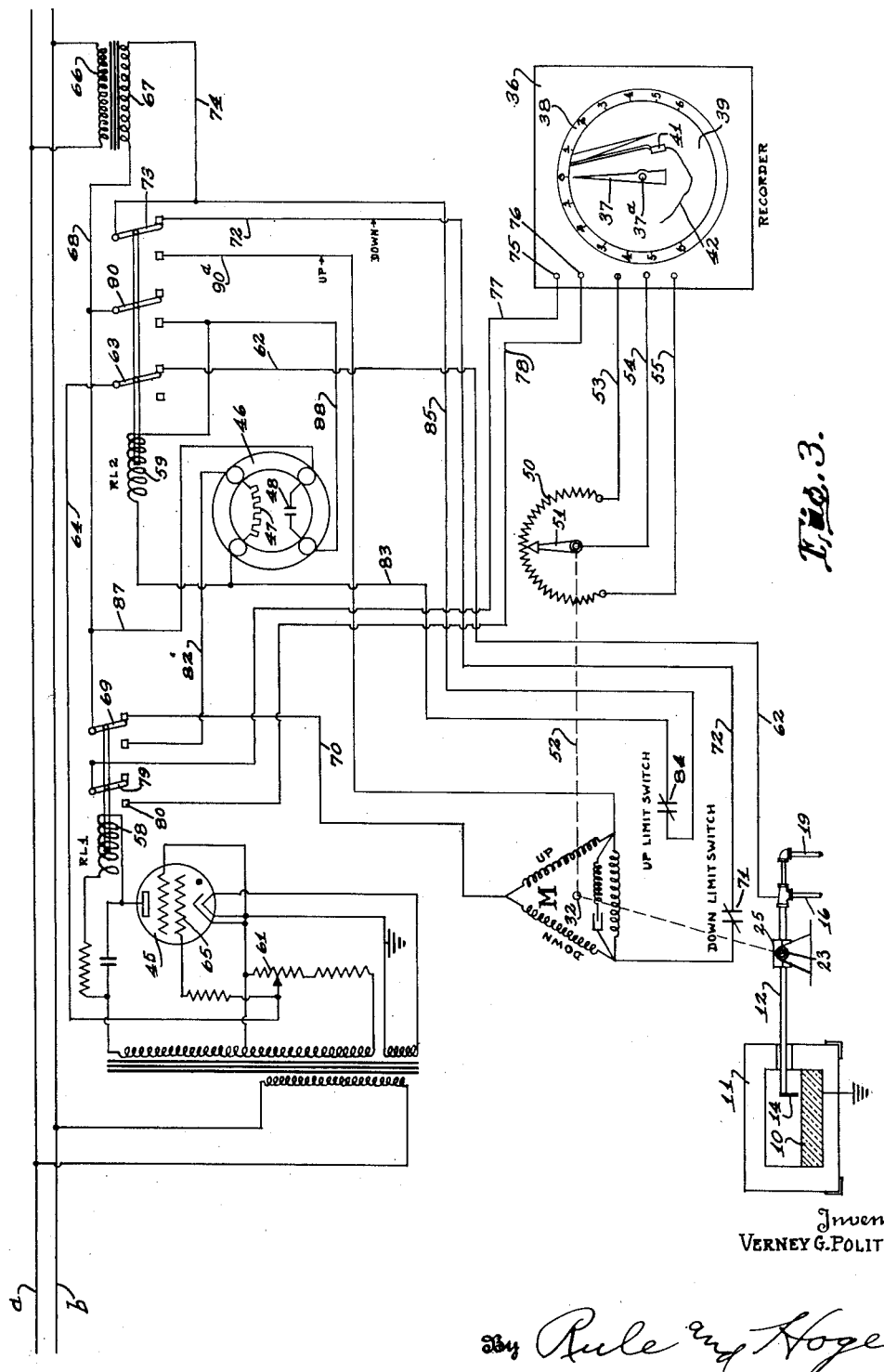

Patented Feb. 17, 1953

2,628,428

UNITED STATES PATENT OFFICE 2,628,428

GLASS LEVEL GAUGE AND RECORDER

Verney G. Politsch, Alton, Ill., assignor to Owens-Illinois Glass Company, a corporation of Ohio Application June 23, 1948, Serial No. 34,687

8 Claims. (Cl. 33—126)

My invention relates to apparatus for indicating and recording the level of a liquid in a container. The apparatus herein illustrated and described is particularly adapted for use in gauging and recording the level of molten glass in a glass furnace tank. The invention is of a scope to cover other mechanisms, materials and uses.

An object of the invention is to provide an apparatus which will accurately indicate at all times the level of molten glass in a tank and also make a record showing the glass level and any fluctuations therein over an extended period of time.

A further object of the invention is to provide, in combination with a recording instrument, means for intermittently actuating the recorder at short time intervals and thereby providing a record showing the glass level throughout a day or period of hours. The invention provides a probe which extends over the glass in the tank and is provided with a feeler adapted to contact the surface of the glass and which serves as an electrode. The probe is connected to a reversible motor which moves the probe up and down for making and breaking electrical contact with the glass. The glass level recorder is operatively connected to the motor through electrical control mechanism when the probe makes contact with the glass.

Another object of the invention is to provide means by which the recorder motor is energized only at times during which the driving motor is at rest with the probe in contact with the glass, and thereby providing an accurate record of the glass level, free from irregularities or fluctuations which would otherwise be registered due to the up and down movements of the probe.

Other objects of the invention will appear hereinafter.

Referring to the acompanying drawings:

Fig. 3 is a wiring diagram of the apparatus.

Figure 1:
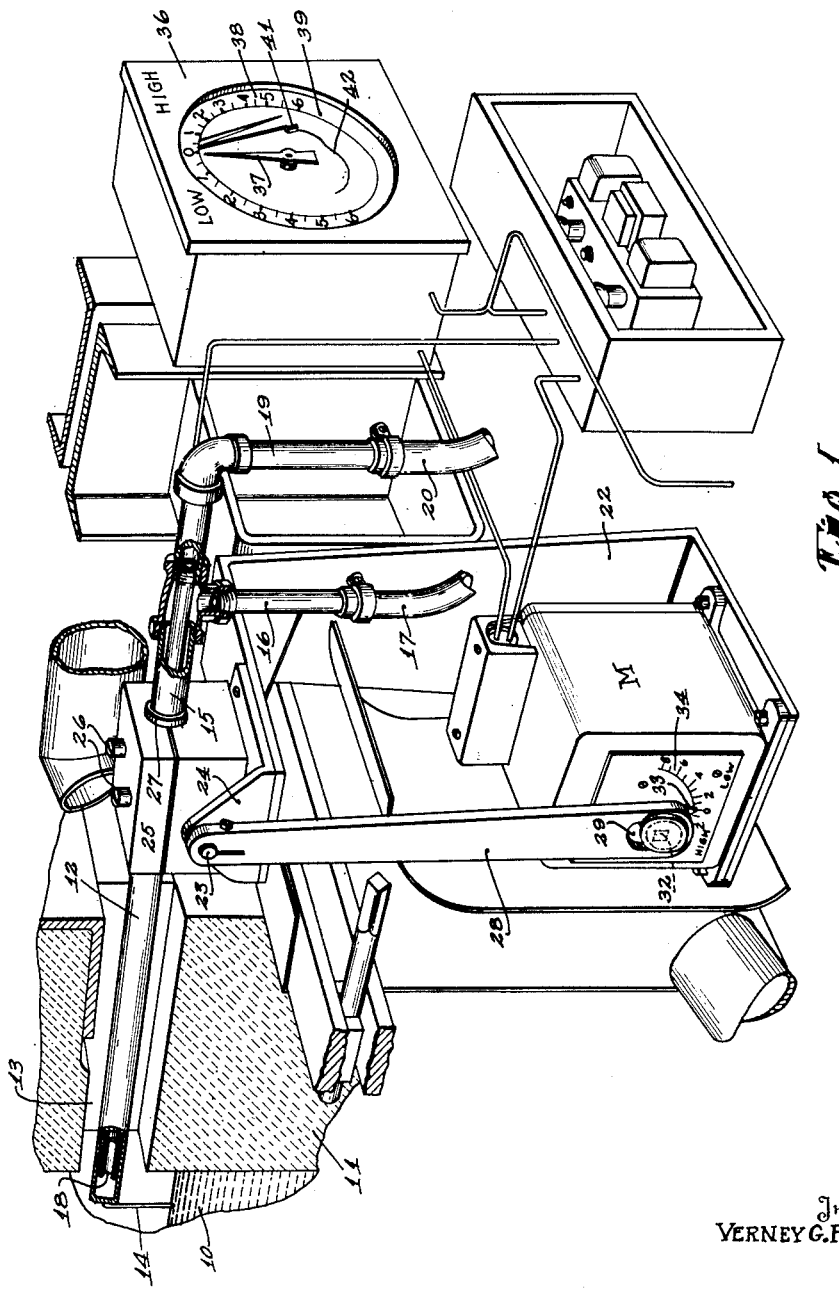
Fig. 1 is a perspective view, with parts broken away and parts shown in section, of an apparatus embodying my invention.
Figure 2:
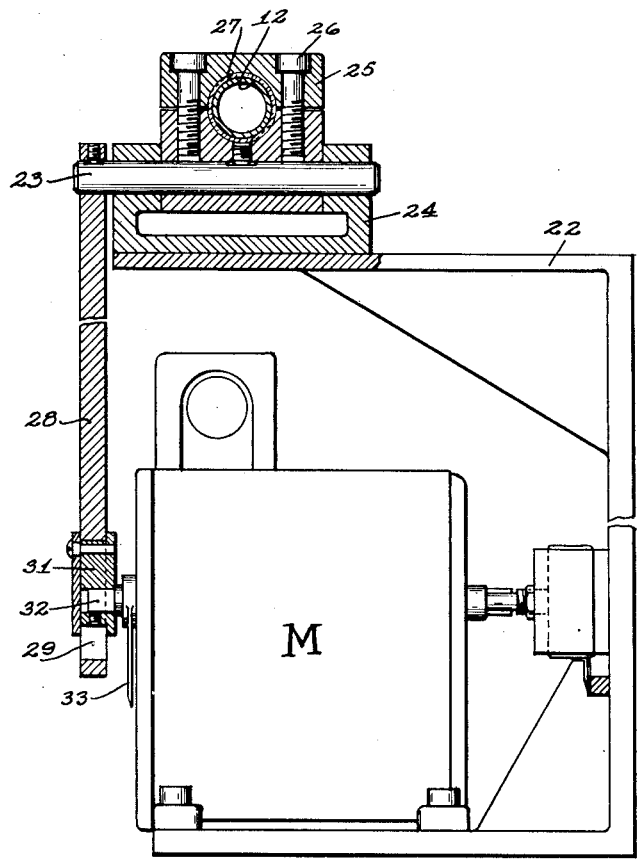
Fig. 2 is a part sectional elevation of the motor, probe, and driving connections therebetween.

The apparatus is designed to gauge, indicate and record the level of the molten glass 10 in the furnace tank 11. A water cooled probe 12 extends through an opening 13 in the wall of the tank and carries a feeler 14, preferably in the form of a platinum wire tip, adapted to make electrical contact with the molten glass 10. The probe comprises an outer pipe 15 to which cooling water is supplied through an inlet pipe 16 connected to a rubber hose 17. The cooling fluid flows forward through the pipe 15 and is returned through an inner tube 18 which is connected to an outlet pipe 19 and rubber hose 20. The flexible hose pipes 17 and 20 permit rocking of the probe and also serve as electrical insulation.

An electric motor M is mounted in a frame 22, and is operatively connected to the probe for rocking the latter about the axis of a rock shaft 23 journalled in a bracket 24 mounted on the frame 22. The probe is clamped in a split block 25 by screw bolts 26, said block being keyed to the rock shaft 23. An insulating gasket 27 is interposed between the probe and the block 25.

Operating connections between rock shaft 23 and the motor include a vertically disposed rock arm 28 keyed at its upper end to the shaft 23 and formed adjacent to its lower end with a vertically elongated slot 29. An eccentric 31 is keyed to the shaft 32 of the motor and swings in the slot 29 as the motor operates and thereby rocks the arm 28, thus swinging the probe and moving the electrode 14 up and down.

The motor M is designed for a limited oscillating movement of its shaft through an arc of 180 degrees more or less. A pointer 33 is fixed to the motor shaft 32, indicates on a scale 34, the position of the probe, and is thus an index of the glass level. A glass level recorder 36 which can be located in any convenient position, comprises an electric motor 37$^a$ to which is attached a pointer 37 which indicates on a graduated scale 38, the level of the glass. The scale markings may be graduated to indicate, for example in tenths of an inch, the height of the glass either above or below a predetermined normal level. The recorder comprises a circular dial 39 which is rotated by clock work. The stylus 41 connected to the recorder motor, operates in a conventional manner to mark a record 42 on the dial 39. The recorder and its motor are of well-known construction and their operation as hereinafter described will be readily understood without further illustration.

Referring to the wiring diagram, Fig. 3, the motor M and electric control devices are supplied with power from the mains $a$ and $b$ of an alternating current system. The direction of rotation of the motor M is under the control of relays RL$^1$ and RL$^2$ herein referred to as relay No. 1 and relay No. 2 respectively. Relay RL$^1$ is under the control of an electron tube 45 shown as a Thyratron. The operation of the No. 2 relay is controlled and retained by a thermal delay relay 46 as hereinafter described. The relay 46 is of conventional construction and comprises a resistor 47 which when connected in circuit is raised to a high temperature and operates to connect the contacts 48 of a thermo-couple after a predetermined time delay, as for example five seconds.

A rheostat which comprises a resistance 50 and a slide arm 51, is actuated by the motor M. The arm 51 has an operating connection 52 with the motor M, being either directly or indirectly connected to the motor shaft 32. The rheostat is connected to the recorder motor through wires 53, 54 and 55 so that the recorder pointer 37 and stylus 41 assume positions determined by that of the rheostat arm 51, the position of said arm being determined by the position to which the rotor of the motor M has been brought.

The diagram, Fig. 3, shows the parts in the positions assumed while the rotor of the motor is moving in a direction to lower the probe electrode 14, referred to herein as the "down" direction. The plate circuit of the tube 45 is open and the magnet coils 58 and 59 of the relays are in open circuit. As the probe moves down, the rheostat arm 51 is swung by the motor to a corresponding position. When the probe 14 makes contact with the grounded glass 10, it short circuits a resistance 61 in a grid circuit of the Thyratron 45, the short circuit being through the probe 12, wire 62, relay contact bar 63, and wire 64. The grid 65 of the Thyratron is thus rendered sufficiently negative to fire the tube so that the relay coil 58 in the plate circuit of the tube is energized and operates the relay RL¹.

The motor M is driven by power supplied from the mains a, b through a step-down transformer comprising a primary coil 66 and secondary coil 67. The circuit for the motor may be traced from the secondary coil 67 through conductor 68, relay switch arm 69, wire 70, motor M, down-limit switch 71, wire 72, relay arm 73 and wire 74. When relay RL¹ operates as above described, the motor circuit is opened at the switch arm 69, thereby stopping the motor. The operation of the relay at the same time closes a short circuit across the terminals 75 and 76 of the recorder 36, through wires 77 and 78 leading respectively to relay arm 79 and contact 80. The recorder motor is thus energized and moved to a position determined by the amount of the rheostat resistance 50 in the circuit, which in turn corresponds to the position at which the rotor of motor M has stopped, so that the recorder indicates and records the glass level.

The operation of the No. 1 relay also establishes a circuit through the resistor 47 of the delay relay 46, connecting it across the transformer coil 67. This circuit may be traced from the coil 67 through wire 68, contact bar 69, wire 82, resistor 47, wire 83, up-limit switch 84, and wires 85 and 74. The resistor 47 therefore heats up and after a predetermined time, for example 5 seconds, closes the contacts 48 and thereby establishes a circuit for the relay coil 59. This circuit may be traced from the transformer coil 67 through wires 68, 87, contacts 48, wire 88, relay coil 59, wire 83, up-limit switch 84 and wires 85 and 74. When the relay coil 59 is thus energized, the relay operates and reverses its switch arms 63, 90 and 73 with the following results. The switch 90 connects the wire 68 directly with the relay coil 59, thus shunting the thermal relay 46 and providing a holding circuit for the relay coil 59. The switch arm 63 opens the ground circuit extending from the glass through the probe 12 and wire 62, thus introducing the resistance 61 into the grid circuit of the tube 45 and stopping the current flow in the plate circuit so that the relay coil 58 is deenergized. The No. 1 relay, therefore, reverses to the position shown. This opens the record circuit at the switch arm 79 so that the recorder remains in status quo until the electrode 14 has been lifted and again lowered to contact the glass in the next succeeding cycle of operations. The switch arm 69 completes a circuit through the wire 70 leading to the motor. The switch arm 73 of No. 2 relay reverses the connections of the up and down wires 90ª, 72 from the motor, completing the motor circuit through the up wire 90ª so that the motor starts in the up direction and swings the probe upward to lift the electrode 14 out of contact with the glass. The motor continues its upward movement until the up-limit switch 84 is opened. This breaks the circuit through the relay coil 59 so that the No. 2 relay is again reversed, being returned to the position shown. The switch arm 73 therefore again reverses the motor connections so that the motor stops and immediately starts in its downward direction. This completes the cycle of operations.

It will be seen that during each cycle of operations, the recorder is energized immediately after the electrode 14 contacts the glass and while the motor M is at rest. The recorder motor remains energized, during the time interval required to operate the thermal delay relay 46, the position of the recording stylus and indicator remaining unchanged during this interval and until a change in the glass level causes the motor M to be stopped in a different position during a succeeding cycle of operations. There are normally several complete cycles per minute and the recording line 42 is substantially a smooth line. The length of time of each cycle depends upon the height of the glass level, the time being comparatively short when the level of the glass is high.

If it is desired, the apparatus herein disclosed may be used to control the level of the glass by controlling the operation of the motor for the batch feeder. For this purpose, the relays may operate switches in a control circuit of the batch feeder motor.

Modifications may resorted to within the spirit and scope of my invention.

I claim:

1. Apparatus for gauging and recording the level of molten glass in a tank, said apparatus comprising an electrode, a reversible motor, operating connections between the motor and electrode for moving the latter into and out of contact with the molten glass, means for supplying operating current to the motor, a relay comprising an electromagnet, means for energizing the electromagnet and actuating the relay when the said electrode contacts the glass, means operated by the relay to stop the motor, a second relay comprising a reversing switch in the motor circuit, a time delay device for operating said second relay a predetermined time limit after the first mentioned relay is operated, a recorder, and electro-responsive means actuated by the motor to operate the recorder.

2. The combination of an electrode, automatic means for periodically lowering the electrode into contact with the surface of a liquid, arresting the electrode when it contacts the liquid and lifting the electrode and breaking the contact, a recorder, and electro-responsive means for energizing the recorder while the electrode is in contact with the liquid and maintaining the recorder deenergized while the electrode is out of contact with the liquid.

3. The combination set forth in claim 2, including means for maintaining the electrode at rest for a predetermined time interval while in contact with the liquid, a rheostat in circuit with the recorder, and automatic means for actuating the rheostat and introducing into the circuit of the recorder an amount of resistance determined by the level of the liquid.

4. The combination of means for automatically gauging and recording the level and variations in the level of a liquid over a predetermined time interval, comprising an electrode mounted over the liquid for downward movement into contact with the liquid and upward movement to break such contact, a reversible motor, means providing operating connections between the motor and the electrode for effecting said up and down movements, electro-responsive means controlling the operations of said motor including a control circuit comprising said electrode and the liquid and operative to periodically reverse the motor, thereby moving the electrode up and down, said means for controlling the operations of the motor including a time delay relay operative to maintain the motor at rest for a predetermined time interval while the electrode is in contact with the liquid, and a recorder operatively connected to the motor and comprising automatic means to record the level of the liquid while the electrode is in contact with the liquid.

5. The combination of means for automatically gauging and recording the level and variations in the level of a body of molten glass over a predetermined time interval, comprising an electrode mounted over the glass for downward movement into contact with the glass and upward movement to break such contact, a reversible motor, a gas-fired electron tube, a grid circuit for said tube including said electrode and operative to fire the tube when the electrode makes contact with the glass, control means including relays controlling the operation of said motor, an electromagnet coil of one said relay being included in the plate circuit of the said tube, and a recorder operatively connected to the motor and comprising means for indicating and recording the level of the glass during each contact of the electrode therewith, said control means including a time delay relay by which the upward movement of the electrode is delayed during a predetermined time interval after each contact of the electrode with the glass, and means for deenergizing the relay and maintaining it deenergized except during the said time intervals in which the electrode is in contact with the glass.

6. Apparatus for gauging the level of molten glass in a tank, said apparatus comprising a probe extending over the glass, an electrode carried by said probe, a reversible motor, means providing operating connections between the motor and the probe for actuating the probe and moving the electrode up and down, from and to the molten glass, said motor comprising a reversible rotor, means for supplying operating current to the motor, electrical control means including means for stopping the motor when the electrode makes contact with the molten glass, a time delay relay, means for establishing a control circuit for the relay when the electrode makes contact with the glass and causing the relay to operate after a predetermined time interval to complete a control circuit for the motor and start it in the direction to lift the electrode out of contact with the glass, automatic means for reversing the motor when the electrode has been lifted to a predetermined height, a recorder, and means for causing the recorder to register the position of said electrode each time the motor is brought to rest with the electrode in contact with the glass and preventing registration of the position of the electrode at any time while the electrode is out of contact with the glass.

7. The combination set forth in claim 2 including means for maintaining the electrode at rest for a predetermined time interval while in contact with the liquid.

8. The combination of means for automatically gauging and recording the level and variations in the level of a body of molten glass over a predetermined time interval, comprising an electrode mounted over the glass for downward movement into contact with the glass and upward movement to break such contact and insulate the electrode from the molten glass, a reversible motor, means providing driving connection between the motor and the electrode for effecting said movements of the electrode, a gas-filled electron tube, a grid circuit for said tube including the electrode, molten glass and a resistance connected across the electrode and glass so that said resistance is short-circuited when the electrode contacts the molten glass and thereby fires the tube, a plate circuit for the tube, means for controlling the operation of the motor including a relay comprising an electromagnet coil in the plate circuit of said tube and means operated by said coil to open the motor circuit while the motor is driving the electrode downward and thereby stop the motor and the downward movement of the electrode, a second relay, means actuated by the first mentioned relay to establish a circuit for the second relay, means actuated by said second relay to complete a circuit for driving the motor in the reverse direction and thereby lifting the electrode away from the glass, thus introducing said resistance into the grid circuit so that the said plate circuit is opened and the said relay electromagnet deenergized, a limit switch operable to open the circuit of the second relay and reverse the motor so that the electrode is again lowered, and a recorder operatively connected to the motor and comprising means for indicating and recording the level of the glass during each contact of the electrode therewith.

VERNEY G. POLITSCH.

REFERENCES CITED

The following references are of record in the file of this patent:

UNITED STATES PATENTS

| Number | Name | Date |
| --- | --- | --- |
| 1,871,469 | Rhea et al. | Aug. 16, 1932 |
| 2,032,016 | Hitner | Feb. 25, 1936 |
| 2,306,372 | Banks | Dec. 29, 1942 |
| 2,321,605 | Keinath | June 15, 1943 |
| 2,380,436 | Holdman | July 31, 1945 |
| 2,388,812 | Albin | Nov. 13, 1945 |
| 2,394,220 | Wagner | Feb. 5, 1946 |
| 2,452,615 | Thomson | Nov. 2, 1948 |
| 2,483,333 | Cannon et al. | Sept. 27, 1949 |
| 2,534,958 | Deming | Dec. 19, 1950 |

OTHER REFERENCES

General Electric Research Laboratory, June 1930, Number 491; page 17, Figure 27; page 21, Figure 39.